June 5, 1923.
B. A. MIKKELSON
LINE SHAFT SHOCK ABSORBER
Filed May 12, 1921
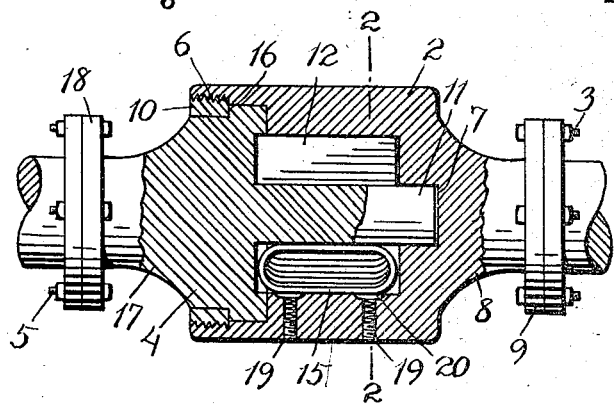
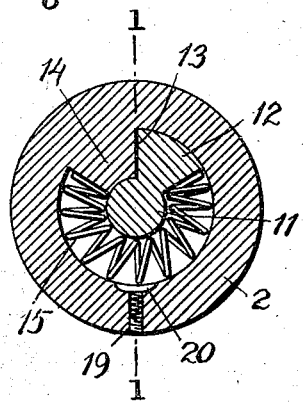
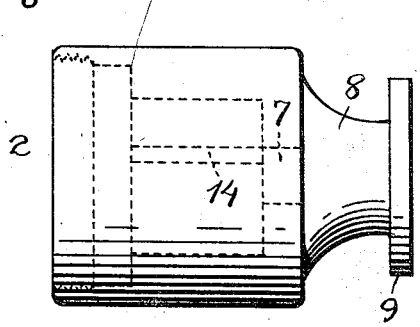
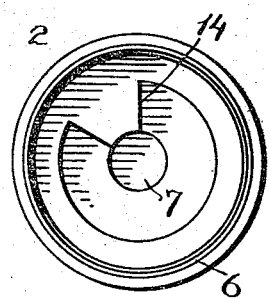
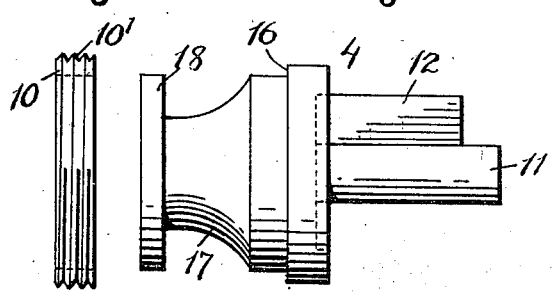
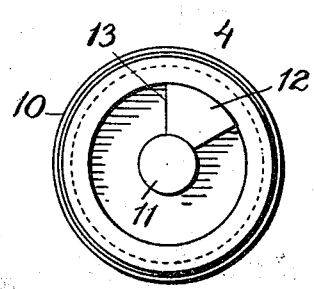
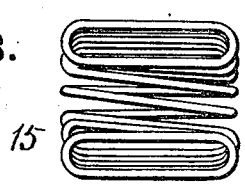
Inventor
B. A. Mikkelson.
by E. W. Anderson
Attorney.

Patented June 5, 1923.

1,457,711

UNITED STATES PATENT OFFICE.

BERENT A. MIKKELSON, OF SEATTLE, WASHINGTON.

LINE-SHAFT SHOCK ABSORBER.

Application filed May 12, 1921. Serial No. 468,906.

*To all whom it may concern:*

Be it known that I, BERENT A. MIKKELSON, a citizen of the United States, resident of Seattle, in the county of King and State of Washington, have made a certain new and useful Invention in Line-Shaft Shock Absorbers; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a section longitudinally and centrally of the invention, on the line 1—1 Figure 2.

Figure 2 is a transverse section on the line 2—2 Figure 1.

Figure 3 is a detail side view of the body member.

Figure 4 is a detail end view of the same.

Figure 5 is a detail side view of the interior member.

Figure 6 is a detail end view of the same.

Figure 7 is a detail side view of the annulus.

Figure 8 is a detail side view of the spring.

The invention has relation to shock absorbers for line shafting, having for an object to provide an improved device for the purpose, of simple, compact and durable nature. Other objects and advantages will appear.

The invention consists in the novel construction and combination of parts, as hereinafter set forth.

In the accompanying drawings illustrating an embodiment of the invention, the numeral 2, designates the exterior or body member of the device, bolted to the line shaft at 3, and 4 designates the interfitting interior member of the device, bolted to the line shaft at 5. The body member is of hollow cylindrical form, open at one end, which is formed with an internal screw thread 6, and the opposite closed end of said member has a cylindrical recess or seat 7, and a tapered portion 8, terminating in a flange 9, for the bolts 3.

The interior member has revolubly mounted thereon an annulus 10, provided with an external thread 10' engaging the thread 6, and closes the open end of the body member, the former member having a central cylindrical extension 11, of a length sufficient to engage the recess or seat 7, and a radial lug 12 of approximately sector form in cross section, one lateral face 13 of which engages normally a lateral face of a similarly formed radial lug 14, projecting inwardly of the cavity of and rigid with the body member, an elastic member or coiled spring 15, fitting in the cavity of the body member around the central projection 11, and at one end thereof engaging the other lateral face of the lug 12, and at its other end engaging the other lateral face of the lug 14, said spring maintaining the normal engagement stated of the adjacent lateral faces of the two lugs.

The internal or complemental member 4 is provided with a tapered portion 17, having a flange 18, for the bolts 5.

The body member is provided with radial recesses or perforations 19, wherein are located spring devices 20, engaging the elastic member or coiled spring 15, to prevent the latter from rattling or noisy vibration in the rotation of the shafting.

In the operation of the invention, the member 2 is the driving member to which the power is applied, and in its rotation, through the lug 12, spring 15, and lug 14, the driving impulse is communicated to the member 4, the annulus 10 being rigid with the member 2 and moving therewith revolubly upon the member 4 until the latter member is set into rotation, any sudden starting of the driving member being communicated gradually to the driven member, the shock being absorbed by the spring.

The central extension 11 of one member engaging the recess in the closed end of the other member, in combination with the engagement of the annulus 10 of the member 2 with the shoulder 16 of the member 4, makes the device stronger, the two members being thereby better braced against relative movement.

The invention is designed to be made with the body member of a diameter of not more than 4½ inches, whereby it is better adapted for use upon the drive shaft of automobiles. The invention is rigid against movement longitudinally tending to separate the members thereof, as is necessary in such use, due to the fact that the differential gears and transmission gears cannot move longitudinally to any extent.

The invention is composed of but four parts, takes up but little space, is economical to manufacture, and requires no oiling or other attention once it is installed.

I claim:—

A line shaft shock absorber, comprising a hollow casing member having an open end and a closed end, the latter provided with a central recess, a complementary member closing the open end of the casing member and provided with a circumferential revoluble connection therewith including a coupling ring adapted to resist thrust in one direction and a shoulder bearing to resist thrust in the other direction, said complementary member having an outer shaft extension integral therewith and provided with a collar enlargement having bolt connection with the line shaft, said complementary member having also an inner shaft extension integral therewith and engaging said recess and a radial lug integral therewith and with said inner shaft extension and bracing the same, said inner shaft extension being of less diameter than said outer shaft extension, and a flattened spiral spring within the casing member and engaging said lugs, said casing member having a shaft extension integral therewith and having a collar enlargement having bolt connection with the line shaft.

In testimony whereof I affix my signature in presence of two witnesses.

BERENT A. MIKKELSON.

Witnesses:
HANS OLSEN,
JOHN O. SELLEVOLD.